United States Patent [19]

Ohmae et al.

[11] Patent Number: 4,997,872

[45] Date of Patent: Mar. 5, 1991

[54] RESINOUS COMPOSITION

[75] Inventors: Tadayuki Ohmae; Hisao Tanaka; Mitsuyuki Okada, all of Chiba, Japan

[73] Assignee: Sumitomo Chemical Company, Ltd., Osaka, Japan

[21] Appl. No.: 404,495

[22] Filed: Sep. 8, 1989

[30] Foreign Application Priority Data

Sep. 8, 1988 [JP] Japan ................. 63-225948

[51] Int. Cl.$^5$ .................... C08L 51/06; C08L 23/10
[52] U.S. Cl. .................. 524/433; 524/430; 524/436; 524/504; 525/71; 525/74; 525/75
[58] Field of Search .............. 525/71, 74, 75; 524/430, 433, 436, 504

[56] References Cited

U.S. PATENT DOCUMENTS 4,946,895 8/1990 Ohmae ................ 525/75

FOREIGN PATENT DOCUMENTS 62-190266 8/1987 Japan.

Primary Examiner—John C. Bleutge
Assistant Examiner—David Buttner
Attorney, Agent, or Firm—Cushman, Darby & Cushman

[57] ABSTRACT

A resinous composition suitable for powder coating comprises (A) 80–98 parts by weight of a polypropylene composition comprising a crystalline propylene polymer grafted with an unsaturated carboxylic acid or an anhydride thereof, (B) 20–2 parts by weight of an ethylene/α-olefin copolymer having a density of 0.860–0.915 g/cm$^3$, (C) 0.001–1.0 part by weight of a polymer of vinyl cycloalkane having 6 or more carbon atoms, and (D) 0–10 parts by weight of a metal oxide or a metal hydroxide.

10 Claims, No Drawings

RESINOUS COMPOSITION

The present invention relates to a resinous composition and more particularly, to a resinous composition suitable for powder coating which forms a costing layer excellent in adhesion, heat resistance, gloss and elongation and which comprises, in a specific ratio, (A) a specific polypropylene composition, (B) an ethylene/α-olefin copolymer, and (C) a polymer of vinyl cycloalkane having 6 or more carbon atoms, and, if necessary, (D) a metal oxide or a metal hydroxide.

Powder coating on the basis of such olefin polymer as ethylene polymer and propylene polymer has been widely used to provide corrosion resistance, chemical resistance, durability, staining resistance and so on to metal articles. Difficulty encountered in this sort of coating is that the coating is inferior in adhesion with metals since olefin polymer is non-polar. Modification of olefin polymer, e.g., grafting or copolymerizing monomers having polar groups on or with the olefin polymer is proposed in order to solve the difficulty above (Japanese Patent Kokai Nos. 48-103645, 54-155242, 55-118975, 59-30841 and others). However; these improvements in adhesion with metals are not satisfactory yet even after such modification is made.

Furthermore, ethylene polymer hardly provides enough heat resistance when coating is made on pipes for supplying hot water, environmental parts of engines of automobiles and so on which are subjected to high temperature. Propylene polymer is not tolerable with respect to rust prevention or protection, since elongation of coated layer is so small that the layer is ready to be cracked when deformation working of a metal base is made or impact is applied to, although the polymer is superior in heat resistance.

Under the circumstances, the inventors proposed, in Japanese Patent Kokai Nos. 62-190265 and 62-190266, a composition comprising a specific modified polypropylene, an ethylene polymer, a metal oxide or a metal hydroxide and a vinyl cycloalkane polymer of 6 or more carbon atoms, or a nucleating agent, but coating layer formed by such techniques is still insufficient in elongation and cannot be put to practical use.

The object of the present invention is to provide a resinous composition suitable for powder coating which is able to form a coating layer especially excellent in balance of heat resistance, elongation, gloss, smoothness and adhesion to metal.

The present invention relates to a resinous composition which comprises (A) 80–98 parts by weight of a polypropylene composition comprising a crystalline propylene polymer grafted with an unsaturated carboxylic acid or an anhydride thereof, (B) 20–2 parts by weight of an ethylene /α-olefin copolymer having a density of 0.860–0.915 g/cm$^3$, (C) 0.001–1.0 part by weight of a polymer of vinyl cycloalkane having 6 or more carbon atoms, and (D) 0–10 parts by weight of a metal oxide or a metal hydroxide.

The present invention will be explained in detail.

(A) The polypropylene composition

The polypropylene composition used in the present invention comprises a crystalline propylene polymer grafted with an unsaturated carboxylic acid or an anhydride thereof. The crystalline propylene polymer to be grafted includes crystalline propylene homopolymer, crystalline propylene/α-olefin random copolymer and crystalline propylene/α-olefin block copolymer. The α-olefins are those of 2–10 carbon atoms other than propylene, and ethylene and 1-butene are most suitable. Furthermore, among the crystalline propylene polymers, preferred are crystalline propylene/α-olefin random copolymers of (a) 90–99% by weight of propylene and (b) 10–1% by weight of α-olefin of 2–10 carbon atoms excluding propylene. Preferable melt index (JIS K-6758, hereinafter referred to as "MI") of the crystalline propylene polymer is 0.1–20 g/10 min.

The polypropylene composition may contain ungrafted crystalline propylene polymers. The polypropylene composition of the present invention can be prepared, for example, by any of known processes such as those disclosed in Japanese Patent Kokoku Nos. 43-27421 (melt kneading process), 44-15422 (solution modification process) and 43-18144 (slurry modification process).

Unsaturated carboxylic acid for grafting is acrylic acid, methacrylic acid, maleic acid, fumaric acid, itaconic acid, crotonic acid, citraconic acid, sorbic acid, mesaconic acid and the like. Unsaturated dicarboxy anhydride is maleic anhydride, itaconic anhydride, citraconic anhydride, himic anhydride, and the like. Preference are acrylic acid and maleic anhydride. In grafting, unsaturated aromatic monomers such as styrene may be used as well.

Peroxide used in grafting is 2,5-dimethyl-2,5-di(t-butylperoxy)hexane, 2,5-dimethyl-2,5-di(t-butylperoxy)-hexyne-3, decumylperoxide, t-butylperoxylaurate, t-butylisobutyrate, diisopropylbenzene hydroperoxide and the like. Proper variety of peroxide is selected depending on a resin to be modified and conditions for modification. Grafting is effected usually at 100°–300° C.

In the polypropylene composition, grafted polypropylene thus obtained may be used alone and in the form of a mixture with ungrafted polypropylene. That is, the polypropylene composition comprises 5–100% by weight of the grafted polypropylene and 95–0% by weight of ungrafted polypropylene.

Unsaturated carboxylic acid or anhydride thereof contained in the polypropylene composition is preferably 0.01–5% by weight. When the amount is smaller than 0.01% by weight, lack in adhesion is brought about and when the amount is larger than 5% by weight, discloroation is caused.

MI of the polypropylene composition is preferably 3–60 g/10 min., more preferably 6–30 g/10 min. When MI is less than 3 g/10 min., smooth coating layer cannot be obtained and when more than 60 g/10 min., elongation of coating layer is insufficient.

(B) Ethylene/α-olefin copolymer

The ethylene/α-olefin copolymer used in the present invention is a copolymer of ethylene with α-olefin of 3 or more carbon atoms.

As the α-olefin of 3 or more carbon atoms, there may be used straight chain or branched chain α-olefins such as propylene, 1-butene, 1pentene, 1-hexene, 4-methyl-1-pentene, 1-octene and 1-decene and mixtures thereof.

Ethylene content in the ethylene/α-olefin copolymer is 60% by weight or higher, preferably 70% by weight or higher and more preferably 75% by weight or higher. Preferred α171-olefins are those of 3–8 carbon atoms.

Density of the ethylene/αolefin copolymer is 0.860–0.915 g/cm$^3$, preferably 0.870–0.910 g/cm$^3$. Furthermore, maximum melting peak temperature of the copolymer measured by a differential scanning calorimeter (DSC) is 70° C. or higher, preferably 100° C. or higher.

The maximum melting peak temperature is measured by DSC at a heating rate of 4° C./min. The density is measured according to ASTM D1505.

Density of the ethylene/α-olefin copolymer is mentioned above to be 0.860–0.915 g/cm$^3$ because when it is more than 0.915 g/cm$^3$, elongation and gloss of the resulting coating layer is inferior and when less than 0.860 g/cm$^3$, heat resistance of the resulting coating layer greatly decreases. This is an important point of the present invention.

The copolymer can be obtained by copolymerizing ethylene and α-olefin, for example, in the presence of a Ziegler catalyst. The Ziegler catalyst comprises an organometallic activation component (hydrides or alkyl derivatives of metals of Groups I–III of the periodic table) and a halogenated transition metal compound and, if necessary, may contain an anhydrous compound of magnesium or manganese.

(C) vinyl cycloalkane polymer

The polymer includes homopolymer of vinyl cycloalkane, random copolymer of a vinyl cycloalkane with a small amount of the other vinyl cycloalkane or α-olefin or block copolymer of vinyl cycloalkane with α-olefin.

The block copolymer mentioned above is copolymer obtained by multi-step copolymerization between vinyl cycloalkane and α-olefin. It includes (1) copolymer obtained by polymerization of propylene alone after polymerization of vinyl cycloalkane is effected, (2) copolymer obtained by random copolymerization of propylene and the other α-olefin after polymerization of vinyl cycloalkane is effected, (3) copolymer obtained by random copolymerization with propylene alone or other α-olefin after firstly propylene alone is polymerized and secondly vinyl cycloalkane is polymerized. Preferable copolymer is the block copolymer above, and most preferably block copolymer with propylene as exemplified in (1)–(3) above.

The vinyl cycloalkane has six or more carbon atoms and includes vinyl cyclobutane, vinyl cyclopentane, vinyl-3-methylcyclopentane, vinyl cyclohexane, vinyl-2-methylcyclohexane, vinyl-3-methylcyclohexane, vinyl norbornane and the like.

(D) Metal oxide or hydroxide

Proper oxide or hydroxide is that of metals of IIa, IIIa and IVb of the Mandeleev's Periodic Table.

Example is magnesium oxide, calcium oxide, aluminum oxide and titanium dioxide. Preference is magnesium oxide, most preferably powdery one having an iodine absorption of at least 20 mg.I/g.MgO, such as "Kyowa Mag" ® 30 manufactured by Kyowa Kagaku Co., Ltd., Japan.

Example of hydroxide is magnesium hydroxide, calcium hydroxide, o-titanic acid, strontium hydroxide and the like, preferably calcium hydroxide.

Median diameter of the metal oxide or hydroxide is preferably 25 μm or less, more preferably 20 μm or less, from the viewpoints of uniform dispersibility in a resin phase and an improvement in adhesion.

(E) Compounding ratio

The present composition comprises 80–98, preferably 85–96 parts by weight of component (A), 20–2, preferably 15–4 parts by weight of component (B), 0.001–0.1 part by weight of component (C) and 0–10, preferably 0–5 parts by weight of component (D).

When amount of (B) is more than 20 parts by weight, remarkable degradation is brought about in heat resistance as well as in hardness because of reduction in content of (A) and when it is less than 2 parts by weight, improvement in elongation of coating layer is insufficient.

When amount of (C) is less than 0.001 part by weight, elongation and gloss of coating layer is not improved and when more than 1.0 part by weight, the effect by the addition reaches an uppermost limit and this is not economical.

When amount of (D) is more than 5 parts by weight, elongation of coating layer decreases and smooth and glossy coating layer cannot be obtained. There is no lower limit. Elongation of coating layer is markedly excellent when this component is not added. However, since adhesion strength is higher when it is added, the lower limit can be suitably selected depending on balance of elongation and adhesion strength required in practical level.

(F) Production of the composition

Any of conventional melt-kneading processes for an olefin polymer composition can be used, e.g., those using mixing rolls, kneaders, Banbury mixers or extruders. Before the melt-kneading, it is preferable to dry-blend the components by Henschel mixers, ribbon blenders or tumblers until a uniform composition is prepared. Generally, the melt-kneaded composition is pelletized and then mechanically pulverized under room temperature or refrigeration to obtain a powder coating composition.

Other additives may be added, if desired, such as commercially available phenol, sulfur or phosphor antioxidants such as "Irganox" ® 1010, "Cyanox" ® 1790, "Sumilizer" ® BHT "Goodright" ® 3114, "Sumilizer" ®TPS, and "Mark" ® PEP-8; commercially available benzotriazole, benzophenone and hindered amine light resistant agents such as "Tinuvin" ® 328, "Sumisorb" ®510, "Sanol" ®770, "Tinuvin" ®622; halogen, phosphorus and inorganic fire retardants such as tetrabromobisphenol A, tris (β-chloroethyl)phosphate, antimony trioxide and magnesium hydroxide; pigments such as copper phthalocyanine blue, submarine blue, carbon black, titanium dioxide and cadmium yellow; fillers such as calcium carbonate, magnesium carbonate, calcium sulfate, magnesium sulfate, silicon dioxide, alumina, talc, mica, glass fiber, kaoline and wooden powder, and the like.

Materials to be coated are metals such as iron, aluminum, zinc, tin and their alloys and metals or glass on which the metals above are plated. They may be in any shape such as pipes, bars, wires, plates, boxes and the like.

The present composition may be applied to by fluidized dipping, rotary shaping, sintering shaping or electrostatic coating.

The present composition is so ready to be pulverized mechanically that a period of time to this effect is short and energy required is small. Coated layer produced by fluidized dipping or electrostatic coating has the following features:

1. good at adhesion with a metal,
2. superior in heat resistance,
3. high in elongation and excellent in bending,
4. excellent in surface gloss,
5. high in surface hardness and hard to be scratched, and
6. good at melt flowability so that the finished surface is smooth.

Examples of shaped articles to which the present coating is applied are
1. kitchen appliances such as hot water supplying pipes and a drainboard,
2. parts for automobiles such as an electromagnetic shield,
3. household appliances such as dishwasher and a basket in a washing machine, and
4. others such as gardening tools, building materials and daily good.

In order to improve shaped articles obtained using the present composition in water resistance and corrosion resistances such as saline solution resistance and chemical resistance, it is effective to previously treat the surface of articles to be coated such as of metals with known primers and then coat thereon the present composition.

The primers include, for example, mixtures of polymer of diene compound and magnesium oxide, urethane resins, epoxy resins and alkoxy titanate coupling agents as disclosed in Japanese Patent Kokoku Nos. 53-5045 and 50-126727 and Japanese Patent Kokai Nos. 53-40074, 50-82184 and 53-113835.

EXAMPLES

The present invention is explained in more detail by the following non-limitative examples.

Evaluation and values of properties are conducted and measured in the following manner.

(1) Production of coating layer

A powdery composition of 80 meshes or less is spread on a grid blasted steel sheet (roughness: No. 100, defatted by xylene) of 3.2 mm in thickness, 150 mm in length and 150 mm in width and molten for 60 minutes on a hot plate heated to 200° C. and thereafter, left to stand at room temperature to form a coating layer kept cool without application of pressure.

(2) Adhesion strength

Coating layer obtained in (1) is slit into a strip of 1 cm wide and subjected to a tear tester at a tearing rate of 50 mm/min to observe a value when peeling reaches 180°.

(3) Surface gloss

Gloss is measured according to ASTM D532-53T.

(4) Smoothness

Marked eye observation.

(5) Elongation

Silicone greese is previously coated as a parting agent on the steel of (1) and a coating layer is formed in the same manner as in (1). Coating layer is peeled off to obtain a test sheet. This test sheet is slit into a strip (6 mm wide) and elongation is measured by a tensile tester at a tensile rate of 50 mm/min.

(6) Heat resistance

Vicat softening point (1 kg load) of a sample of coating layer obtained in the same manner as for measurement of elongation is measured according to JIS K-7206. The sample is made by piling up coating layers to at least 1 mm hight.

(7) Surface hardness

Shore hardness (D) of coating layer obtained in the same manner as in production of the sample for measurement of elongation is measured according to JIS K-7215.

(8) Melt index (MI)

JIS K-6758 for propylene polymer (230° C., 2.16 kg load) and JIS K-6760 for ethylene polymer (190° C., 2.16 kg load).

(9) Limiting viscosity $[\eta]$

Ubbelohde viscometer is used (135° C., in tetralin or 20° C. in carbon tetrachloride).

EXAMPLE 1

Preparation of the polypropylene composition [hereinafter referred to as "modified PP(A)"]

Crystalline propylene/ethylene random copolymer (ethylene 3.0% by weight; MI: 6.9 g/10 min., hereinafter referred to as PP (1), 100 parts by weight), t-butyl peroxylaulate (0.2 part by weight), maleic anhydride (0.5 part by weight) and "Irganox" ® 1010 (produced by Ciba Geigy, 0.2 part by weight, antioxidant) were dry-blended for 3 minutes in a Henschel mixer.

The blend was extruded at 200° C. through a uni-axial extruder (30 mm in diameter) to obtain an intermediate for modified PP(A) (grafted maleic anhydride 0.1% by weight; MI: 48 g/10 min).

Then, this intermediate (40 parts by weight), PP(1) (60 parts by weight), "Irganox" ® 1010 (0.5 part by weight) and calcium stearate (0.03 part by weight; neutralizer) were blended for 3 minutes in a Henschel mixer. The blend was extruded at a resin temperature of 220° C. through a uni-axial extruder (30 mm in diameter) to obtain modified PP(A) (MI: 16 g/10 min).

PREPARATION OF THE COMPOSITION

The modified PP(A) (90 parts by weight), ethylene/1-butene copolymer (10 parts by weight; density: 0.905 g/cm³; maximum melting peak point measured by DSC (hereinafter referred to as Tm): 117° C.; MI: 10 g/10 min: hereinafter referred to as VLDPE (1)) propylene/ethylene/vinyl cyclohexane copolymer (2 parts by weight; produced according to Japanese Patent Kokai Nos. 60-139710 and 60-139731; $[\eta]$: 1.98 dl/g; vinyl cyclohexane content: 0.90% by weight; ethylene content: 2.9% by weight; referred to as PVCH (1) hereinafter), and magnesium oxide ("Kyowa Mag" ®30; 2.5 parts by weight; median diameter: 2.7 μm; iodine absorption: 35 mg.I/g.MgO; referred to as MgO (1)) were dry blended for 3 minutes in a Henschel mixer.

The blend was extruded at a resin temperature of 210° C. through a uni-axial extruder (30 mm in diameter) to produce pellets (MI: 17 g/10 min).

EVALUATION AS POWDER COATING

The pellets were pulverized by a freeze pulverizer to obtain powder (80 meshes or less). Results of evaluation on the powder are shown in Table 1.

EXAMPLES 2-6

Example 1 was repeated with changing compounding ratio of components (A), (B), (C) and (D) as shown in Table 1. Results of evaluation are shown in Table 1.

EXAMPLES 7-9

Example 1 was repeated except that ethylene/1-butene copolymer (density: 0.880 g/cm³; Tm: 71° C.; MI: 3.6 g/10 min; referred to as VLDPE(2) hereinafter) was used as component (B), vinyl cyclohexane homopolymer (prepared in the same manner as for PVCH(1); $[\eta]$: 0.6 dl/g (in carbon tetrachloride); referred to as PVCH(2) hereinafter) was used as component (C) and calcium hydroxide (manufactured by Wako Junyaku Co.; first class chemical; median diameter: 2.4 μm; referred to as Ca(OH)₂ hereinafter) was used as component (D), and compounding ratio was changed as shown in Table 1. Results of evaluation are shown in Table 1.

COMPARATIVE EXAMPLES 1 AND 2

Example 1 was repeated except that both components (B) and (C) were not added. Results of evaluation are shown in Table 1.

COMPARATIVE EXAMPLES 3–6

Example 1 was repeated except that the following was used as component (B) and compounding ratio was as shown in Table 1. Results of evaluation are shown in Table 1.

(1) Ethylene/1-butene copolymer (density: 0.925 g/cm$^3$; Tm: 123° C.; MI: 6.8 g/10 min; referred to as LLDPE hereinafter).

(2) High-pressure polyethylene (density: 0.920 g/cm$^3$; Tm: 108° C.; MI: 7 g/10 min; referred to as LDPE hereinafter).

(3) Ethylene/vinyl acetate random copolymer (density: 0.921 g/cm$^3$; Tm: 102° C.; vinyl acetate content: 6.3% by weight; MI: 6.7 g/10 min; referred to as EVA hereinafter).

(4) Ethylene/methyl methacrylate random copolymer (density: 0.932 g/cm$^3$; Tm: 100° C.; methyl methacrylate content: 9.7% by weight; MI: 7.0 g/10 min; referred to as EMMA hereinafter).

COMPARATIVE EXAMPLE 7

Example 1 was repeated except that PP(1) on which maleic anhydride was not grafted was used as component (A). Results of evaluation are shown in Table 1.

EXAMPLE 10

Preparation of the polypropylene composition [hereinafter referred to as modified PP(B)]

An intermediate of modified PP(B) was prepared in the same manner as in Example 1 except that crystalline propylene/ethylene random copolymer (ethylene content: 4.9% by weight; MI: 8.4 g/10 min; hereinafter referred to as PP(2)) was used. This intermediate contained grafted maleic anhydride: 0.12% by weight and had an MI: 55 g/10 min.

Modified PP(B) was prepared using this intermediate in the same manner as in Example 1. This PP(B) had an MI: 18 g/10 min.

Preparation of the Composition

Pellets were prepared in the same manner as in Example 1 using PP(B) in place of PP(A). The pellets had an MI: 21 g/10 min.

Evaluation as powder coating

Evaluation was conducted as in Example 1 and the results are shown in Table 1.

EXAMPLE 11

Preparation of the polypropylene composition [hereinafter referred to as modified PP(C)]

Crystalline propylene/ethylene random copolymer (ethylene content: 3.2% by weight; MI: 1.4 g/10 min; referred to as PP(3) hereinafter; 100 parts by weight), crystalline polypropylene (0.1 part by weight carrying 1,3-bis(t-butylperoxyisopropyl)benzene (8% by weight), maleic anhydride (0.8 part by weight), and "Irganox" ® 1010 (0.2 part by weight) were dry-blended for 3 minutes in a Henschel mixer.

The blend was extruded at a resin temperature of 230° C. through a uni-axial extruder (30 mm in diameter) to obtain modified PP(C) (grafted maleic anhydride: 0.04% by weight; MI: 18 g/10 min).

Preparation of the composition

Pellets were prepared in the same manner as in Example 1 except that the modified PP(C) was used in place of modified PP(A) and "Irganox" ® 1010 (0.5 part by weight) and calcium stearate (0.03 part by weight) were added. The pellets had an MI: 19 g/10 min.

Evaluation as powder coating

Results of evaluation conducted in the same manner as in Example 1 are shown in Table 1.

EXAMPLE 12

Preparation of the polypropylene composition [hereinafter referred to as modified PP(D)]

An intermediate of modified PP(D) was obtained in the same manner as in Example 1 except that crystalline propylene homopolymer (MI: 7.0 g/10 min; referred to as PP(4) hereinafter) was used.

This intermediate had a grafted maleic anhydride content: 0.09% by weight and MI: 49 g/10 min.

Modified PP(D) was obtained in the same manner as in Example 1 using the above intermediate and PP(4). This modified PP(D) had MI: 17 g/10 min.

Preparation of the composition

Pellets were prepared in the same manner as in Example 1 except that the modified PP(D) was used in place of modified PP(A). The pellets had MI: 17 g/10 min.

Evaluation as powder coating

Results of evaluation conducted in the same manner as in Example 1 are shown in Table 1.

TABLE 1

| | Component (A) | | Component (B) | | Component (C) | | Component (D) | |
|---|---|---|---|---|---|---|---|---|
| | Kind | Part by weight | Kind | Part by weight | Kind | Part by weight | Kind | Part by weight |
| Example 1 | Modified PP(A) | 90 | VLDPE(1) | 10 | PVCH(1) | 2.0 | MgO(1) | 2.5 |
| Example 2 | Modified PP(A) | 95 | VLDPE(1) | 5 | PVCH(1) | 2.0 | MgO(1) | 2.5 |
| Example 3 | Modified PP(A) | 90 | VLDPE(1) | 10 | PVCH(1) | 2.0 | MgO(1) | 0.5 |
| Example 4 | Modified PP(A) | 90 | VLDPE(1) | 10 | PVCH(1) | 2.0 | — | 0 |
| Example 5 | Modified PP(A) | 90 | VLDPE(1) | 10 | PVCH(1) | 1.0 | MgO(1) | 2.5 |
| Example 6 | Modified PP(A) | 90 | VLDPE(1) | 10 | PVCH(1) | 5.0 | MgO(1) | 2.5 |
| Example 7 | Modified PP(A) | 90 | VLDPE(2) | 10 | PVCH(1) | 2.0 | MgO(1) | 2.5 |
| Example 8 | Modified PP(A) | 90 | VLDPE(1) | 10 | PVCH(2) | 0.1 | MgO(1) | 2.5 |
| Example 9 | Modified PP(A) | 90 | VLDPE(1) | 10 | PVCH(1) | 2.0 | Ca(OH)2 | 1.0 |
| Comparative | Modified PP(A) | 100 | — | 0 | PVCH(1) | 2.0 | MgO(1) | 2.5 |

TABLE 1-continued

| | | | | | | | | |
|---|---|---|---|---|---|---|---|---|
| Example 1 | | | | | | | | |
| Comparative Example 2 | Modified PP(A) | 90 | VLDPE(1) | 10 | — | 0 | MgO(1) | 2.5 |
| Comparative Example 3 | Modified PP(A) | 90 | LLDPE | 10 | PVCH(1) | 2.0 | MgO(1) | 2.5 |
| Comparative Example 4 | Modified PP(A) | 90 | LDPE | 10 | PVCH(1) | 2.0 | MgO(1) | 2.5 |
| Comparative Example 5 | Modified PP(A) | 95 | EVA | 5 | PVCH(1) | 2.0 | MgO(1) | 2.5 |
| Comparative Example 6 | Modified PP(A) | 95 | EMMA | 5 | PVCH(1) | 2.0 | MgO(1) | 2.5 |
| Comparative Example 7 | PP(1) | 90 | VLDPE(1) | 10 | PVCH(1) | 2.0 | MgO(1) | 2.5 |
| Comparative Example 8 | Modified PP(A) | 100 | — | — | PVCH(1) | 2.0 | — | — |
| Example 10 | Modified PP(B) | 90 | VLDPE(1) | 10 | PVCH(1) | 2.0 | MgO(1) | 2.5 |
| Example 11 | Modified PP(C) | 90 | VLDPE(1) | 10 | PVCH(1) | 2.0 | MgO(1) | 2.5 |
| Example 12 | Modified PP(D) | 90 | VLDPE(1) | 10 | PVCH(1) | 2.0 | MgO(1) | 2.5 |

| | Thickness of coating layer (mm) | Adhesion strength (kg/cm) | Surface state | | Elongation (%) | Vicat softening point (C°) | Shore hardness (D) |
|---|---|---|---|---|---|---|---|
| | | | Gloss (%) | Smoothness | | | |
| Example 1 | 0.48 | Peeling off impossible | 50 | Good | 210 | 133 | 70 |
| Example 2 | 0.51 | Peeling off impossible | 53 | Good | 240 | 132 | 69 |
| Example 3 | 0.53 | Peeling off impossible | 55 | Good | 310 | 133 | 69 |
| Example 4 | 0.49 | 2.9 | 52 | Good | 450 | 132 | 70 |
| Example 5 | 0.50 | Peeling off impossible | 46 | Good | 190 | 133 | 69 |
| Example 6 | 0.50 | Peeling off impossible | 56 | Good | 260 | 133 | 70 |
| Example 7 | 0.49 | Peeling off impossible | 58 | Good | 250 | 128 | 67 |
| Example 8 | 0.48 | Peeling off impossible | 42 | Good | 190 | 133 | 69 |
| Example 9 | 0.52 | Peeling off impossible | 51 | Good | 230 | 132 | 70 |
| Comparative Example 1 | 0.53 | Peeling off impossible | 53 | Good | 40 | 133 | 69 |
| Comparative Example 2 | 0.49 | Peeling off impossible | 20 | Good | 30 | 131 | 68 |
| Comparative Example 3 | 0.51 | Peeling off impossible | 23 | Good | 50 | 131 | 66 |
| Comparative Example 4 | 0.48 | Peeling off impossible | 21 | Good | 60 | 129 | 65 |
| Comparative Example 5 | 0.54 | Peeling off impossible | 25 | Good | 60 | 128 | 66 |
| Comparative Example 6 | 0.47 | Peeling off impossible | 25 | Good | 50 | 128 | 67 |
| Comparative Example 7 | 0.50 | 0 | 49 | Good | 90 | 132 | 69 |
| Comparative Example 8 | 0.43 | 3.1 | 60 | Good | 40 | 133 | 70 |
| Example 10 | 0.48 | Peeling off impossible | 65 | Good | 350 | 122 | 62 |
| Example 11 | 0.53 | Peeling off impossible | 52 | Good | 200 | 133 | 69 |
| Example 12 | 0.47 | Peeling off impossible | 62 | Good | 190 | 153 | 83 |

As explained above, the present invention can provide a resinous composition for powder coating which is able to form a coating layer excellent in balance of heat resistance, elongation, gloss, smoothness and adhesion to metals by adding a specific ethylene/α-olefin copolymer.

What is claimed is:

1. A resinous composition which comprises (A) 80–98 parts by weight of a polypropylene composition comprising a crystalline propylene polymer grafted with an unsaturated carboxylic acid or an anhydride thereof, (B) 20–2 parts by weight of an ethylene/α-olefin copolymer having a density of 0.860–0.915 g/cm³, (C) 0.001–1.0 part by weight of a polymer of vinyl cycloalkane having 6 or more carbon atoms, and (D) 0–10 parts by weight of a metal oxide or a metal hydroxide.

2. A resinous composition according to claim 1, wherein the polypropylene composition (A) comprises 5–100% by weight of a crystalline propylene polymer grafted with an unsaturated carboxylic acid or an anhydride thereof and 95–0% by weight of ungrafted crystalline propylene polymer.

3. A resinous composition according to claim 1, wherein the crystalline propylene polymer is a crystalline propylene/α-olefin random copolymer of (a) 90–99% by weight of propylene and (b) 10–1% by weight of α-olefin having 2–10 carbon atoms excluding propylene.

4. A resinous composition according to claim 1, wherein the ethylene/α-olefin copolymer (B) has a density of 0.870–0.910 g/cm³.

5. A resinous composition according to claim 1, wherein the polypropylene composition (A) is one in which the content of the unsaturated carboxylic acid or an anhydride thereof is 0.01–5% by weight of the composition.

6. A resinous composition according to claim 1, wherein the unsaturated carboxylic acid or anhydride thereof is acrylic acid or a maleic anhydride.

7. A resinous composition according to claim 1, wherein the polypropylene composition (A) has an MI of 3–60 g/10 min.

8. A resinous composition according to claim 1, wherein the ethylene/α-olefin copolymer (B) is a copolymer of ethylene and α-olefin having at least 3 carbon atoms.

9. A resinous composition according to claim 1, wherein the vinyl cycloalkane polymer (C) is a block copolymer of vinyl cycloalkane and α-olefin.

10. A resinous composition according to claim 1, wherein metal oxide or hydroxide (D) is magnesium oxide or calcium hydroxide.

* * * * *